US010628441B1

(12) United States Patent
Danilov et al.

(10) Patent No.: US 10,628,441 B1
(45) Date of Patent: Apr. 21, 2020

(54) SYSTEM AND METHOD FOR SELECTIVE STORAGE TRANSFORMATION

(71) Applicant: EMC IP Holding Company LLC, Hopkinton, MA (US)

(72) Inventors: Mikhail Danilov, Saint Petersburg (RU); Gregory Skripko, Seattle, WA (US); Kirill Zakharov, Saint Petersburg (RU); Kirill Gusakov, Saint Petersburg (RU); Irina Tavantseva, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 217 days.

(21) Appl. No.: 15/582,072

(22) Filed: Apr. 28, 2017

(51) Int. Cl.
G06F 17/00 (2019.01)
G06F 16/25 (2019.01)
H04L 29/06 (2006.01)
G06F 16/27 (2019.01)
G06F 16/9535 (2019.01)

(52) U.S. Cl.
CPC ............ *G06F 16/258* (2019.01); *G06F 16/27* (2019.01); *G06F 16/9535* (2019.01); *H04L 63/101* (2013.01)

(58) Field of Classification Search
CPC ..... G06F 16/258; G06F 16/27; G06F 16/9535
See application file for complete search history.

(56) References Cited

U.S. PATENT DOCUMENTS

| 6,741,997 | B1* | 5/2004 | Liu ........................ G06F 16/27 |
| 2004/0122804 | A1* | 6/2004 | Zhang ............... G06F 16/24539 |
| 2006/0242102 | A1* | 10/2006 | Bruno ..................... G06F 16/22 |
| 2009/0055349 | A1* | 2/2009 | Ahmed ............ G06F 16/24537 |
| 2010/0262593 | A1* | 10/2010 | Bruno ................. G06F 16/2228 |
| | | | 707/715 |
| 2013/0332487 | A1* | 12/2013 | Ramesh .............. G06F 16/2455 |
| | | | 707/775 |
| 2015/0347401 | A1* | 12/2015 | Raghavan ............. G06F 16/214 |
| | | | 707/809 |

* cited by examiner

*Primary Examiner* — Syed H Hasan
(74) *Attorney, Agent, or Firm* — Womble Bond Dickinson (US) LLP

(57) ABSTRACT

A transformation job associated with a storage container is created. The transformation job creation includes turning specified comparison predicates into a composite filter. A transformation service is performed for the created transformation job. The transformation service performance includes enumerating content of the storage container and applying the composite filter to each found object. One or more objects that are determined to pass the composite filter are added to an object index of a primary storage.

12 Claims, 7 Drawing Sheets

SYSTEM AND METHOD FOR SELECTIVE STORAGE TRANSFORMATION

FIELD

The disclosure herein relates generally to execution of data storage transformation.

BACKGROUND

Data plays an important and central role in providing value to many businesses and organizations. Typically, new data storages support one or several existing data storage APIs (Application Program Interfaces) and provide some new value-added services. These services allow implementing a new range of solutions for the businesses and/or organizations. The businesses may prefer that the new solutions not only be applied to data stored in new data storages, but also be applied to data stored in old or legacy data storages. Conventionally, the data stored in a legacy data storage would be migrated to a new data storage. However, the businesses may be hesitant to abandon data storages that may be outdated. Also, migration can be a difficult process and take a very long time for large data storages, producing a high load on the storages.

BRIEF DESCRIPTION OF THE DRAWINGS

The embodiments of the disclosure herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In lieu of performing data storage migration, the inventors herein have found that the solutions described below can be applied to existing data storages using storage transformation. For example, Elastic Cloud Storage (ECS) has a built-in transformation service that drives the process of storage transformation. This storage transformation method addresses challenges such as the difficulty in generating an object list for a large system, the slow speed of generating the object list and the high load this creates on the storage under transformation, and that a human typically must be involved in the process during for a long period of time. Also, the storage transformation may use standard features of high-end storages such as multiple users (e.g., profiles) within one storage, multiple containers (e.g., pools or buckets) within one storage, an access control list (ACL), and data query which is potentially an expensive operation.

In one embodiment, the storage transformation process may be performed as follows. A user creates a new transformation job by, for example, registering the storage under transformation as a transformation source. The transformation service connects to the storage under transformation and reads its configuration (e.g, users, containers, ACLs, etc.). The user chooses the containers for which content needs to be transformed. The transformation service uses the information provided to create a configuration subset within ECS (e.g., containers, users and ACLs affected, etc.). The ECS storage becomes a proxy for the storage under transformation. The applications that work with the storage under transformation are switched to the ECS storage use. The user starts the transformation job.

Figure 2:
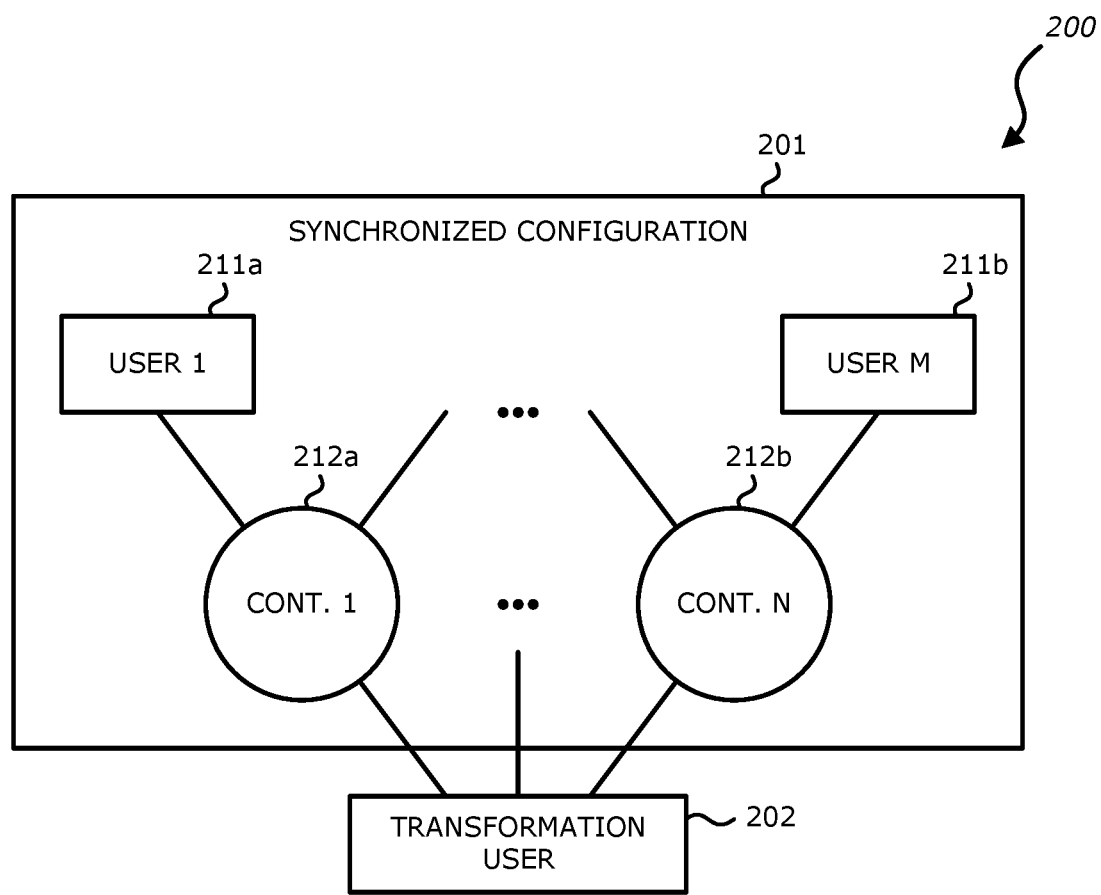
FIG. 2 is a block diagram for explaining an example transformation user used during parallel storage transformation according to an embodiment herein.

In one embodiment, the transformation service may create a dedicated transformation user within the storage under transformation to query all the containers to transform together. For example, as shown in FIG. 2, within a storage 200 transformation user 202 may be created to query containers 212*a* to 212*b* associated with users 211*a* to 211*b* included in synchronized configuration 201.

In one embodiment, the transformation may take a current time and use it as a transformation cutoff time. Objects created before that time may be subject for transformation. The transformation service splits the query time interval, which starts from the moment the oldest object came to the storage under transformation and finishes at the cutoff moment, into a set of time intervals, for example, 1 day long each. The entire enumeration may be decomposed to the set of small enumeration tasks ordered by interval start time. In one aspect, the transformation service runs enumeration tasks from the set (e.g., several at a time). During enumeration, the transformation service may read metadata associated with each object and store it in the object index of ECS. The transformation process finishes after all the enumeration tasks are complete.

By virtue of the foregoing described transformation service, since a list of objects to transform is produced automatically, a user typically does not need to produce such a list which can provide ease of user operability. The transformation service can also automatically derive other related storage configurations and reproduce such within ECS. Also, using one storage user to enumerate all of the containers can assure resource efficiency by reducing overhead associated with data query. Furthermore, by splitting the enumeration time interval into small time intervals and performing parallel processing of these small time intervals by all ECS cluster nodes, it is possible to assure a high speed of transformation process. Finally, a transformation setup algorithm and use of a cutoff time can allow for full autonomy of the transformation process. In most cases, a human may be involved in transformation setup only.

Figure 1:
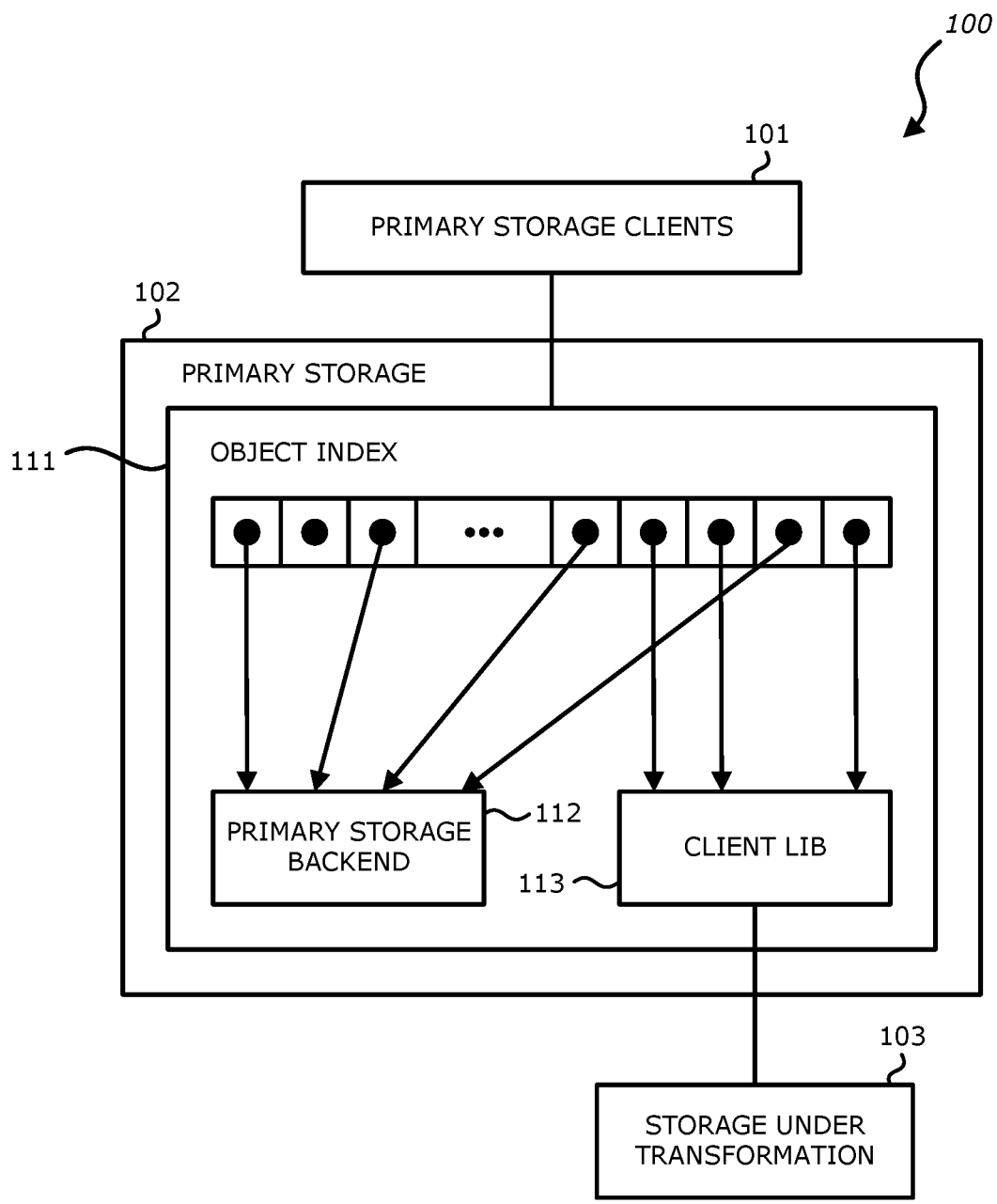
FIG. 1 is a block diagram for explaining an example system for performing selective storage transformation according to an embodiment herein.

FIG. 1 is a block diagram showing an example transformation service 100 according to an embodiment herein. As a result of the transformation service described above, the new storage is primary storage 102 that handles all user traffic for primary storage clients 101. The primary storage 102 maintains index of all the objects stored within the transformed system in an object index 111. Some objects are stored in storage backend 112 of the primary storage 102. Some objects reside in the storage under transformation (e.g., storage under transformation 103). Additional metadata field in the index may indicate an actual location of an object. When some application retrieves an object that belongs to the storage under transformation 103, the primary storage 102 reads the object from the storage under transformation 103 using client library 113 and sends the object back to the application as if it was stored in the primary storage 102. As a result, all of the objects in the transformed system are viewed as equal from an application and value-added services point of view. In particular, applications can access legacy data as if it was migrated and this result can be achieved without actual data move.

As described above, one goal of the built-in transformation service is to perform storage transformation without object list generation, which is normally a painful procedure. However, the inventors herein have found that product management sometimes requires support of object list based storage transformation.

In many cases, users do not want to transform an entire storage. They may want to do transformation only for objects that satisfy some requirement. One example of such a use case is transformation of a compliant storage. In this case, users normally want to do transformation only for objects that are currently under retention, where other objects could be ignored to save resources of a primary storage.

To address the foregoing, embodiments are provided herein for a system and a method for selective storage transformation. In one embodiment, a user can specify comparison predicates to restrict a set of data objects to transform. For example, a user may wish to do transformation only for objects that are currently under retention and ignore the rest. In another example, a user may want to do transformation only for objects created by a particular application (or user). In another embodiment, a set of standard use cases with some canned comparison predicates can be supported to ease the user experience.

According to one embodiment, a transformation job which is associated with a storage container is created. During the creation of the transformation job, comparison predicates specified, for example, by a user are turned into a composite filter. A transformation service is then performed for the created transformation job. The transformation service includes enumerating content of the storage container and applying the composite filter to each found object. One or more objects that are determined to pass the composite filter are then added to an object index of a primary storage.

In one embodiment, during performance of the transformation service, the primary storage assures co-existence of two storages. The co-existence of two storages can be assured, for example, by redirecting a request from a data client, which the primary storage cannot handle, to the storage container under transformation.

In one embodiment, the redirected request can be an update request for a non-transformed object. In this embodiment, metadata of the non-transformed object is read and the composite filter is applied to the object. The object is then added to the object index of the primary storage if the object passes the composite filter.

In one embodiment, in a case where an object is determined to not pass the composite filter because the specified comparison predicate for the object has expired after the transformation job has started and before the transformation job has finished, and the comparison predicate for the object is subsequently reinstated, the transformation service adds the object to the object index of the primary storage.

Figure 3A:
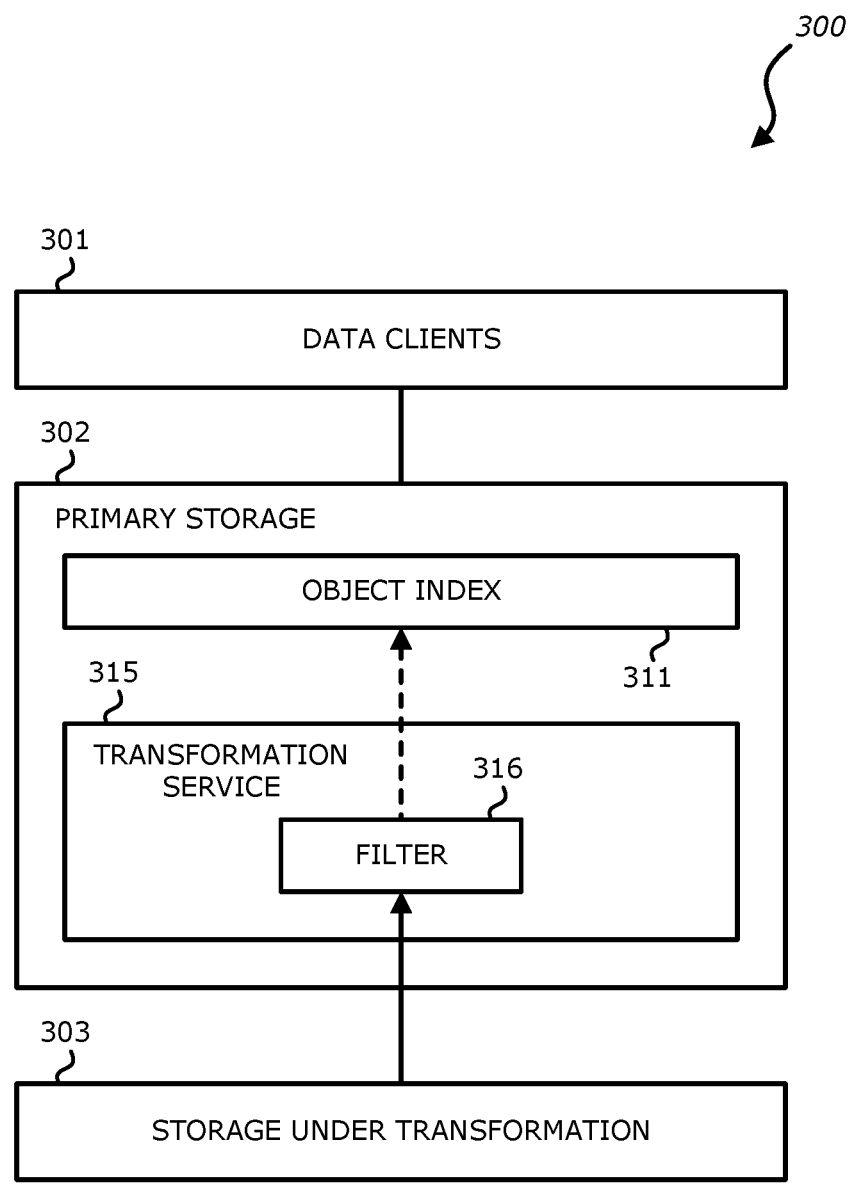
FIG. 3A is a block diagram for explaining an example execution of a selective storage transformation according to an embodiment herein.

FIG. 3A is a block diagram for explaining an example execution of a selective storage transformation 300 according to an embodiment herein. Similar to the block diagram described in connection with FIG. 1, in FIG. 3A, as a result of the transformation service described above, a new storage is primary storage 302 that handles all user traffic for data clients 301. The primary storage 302 maintains index of all the objects stored within the transformed system in an object index 311. Some objects reside in the storage under transformation 303. Additional metadata field in the index may indicate an actual location of an object.

In FIG. 3A, according to one embodiment, the transformation service 315 turns comparison predicates specified by a user during transformation job creation into a composite filter 316. In this embodiment, the transformation service enumerates content of the storage under transformation 303 and applies the filter to every object found to detect objects to transform. Objects that pass the filter 315 are added to the object index 311 of the primary storage 302. In one embodiment, only objects that pass the filter 315 are added to the object index 311 of the primary storage 302.

Figure 3B:
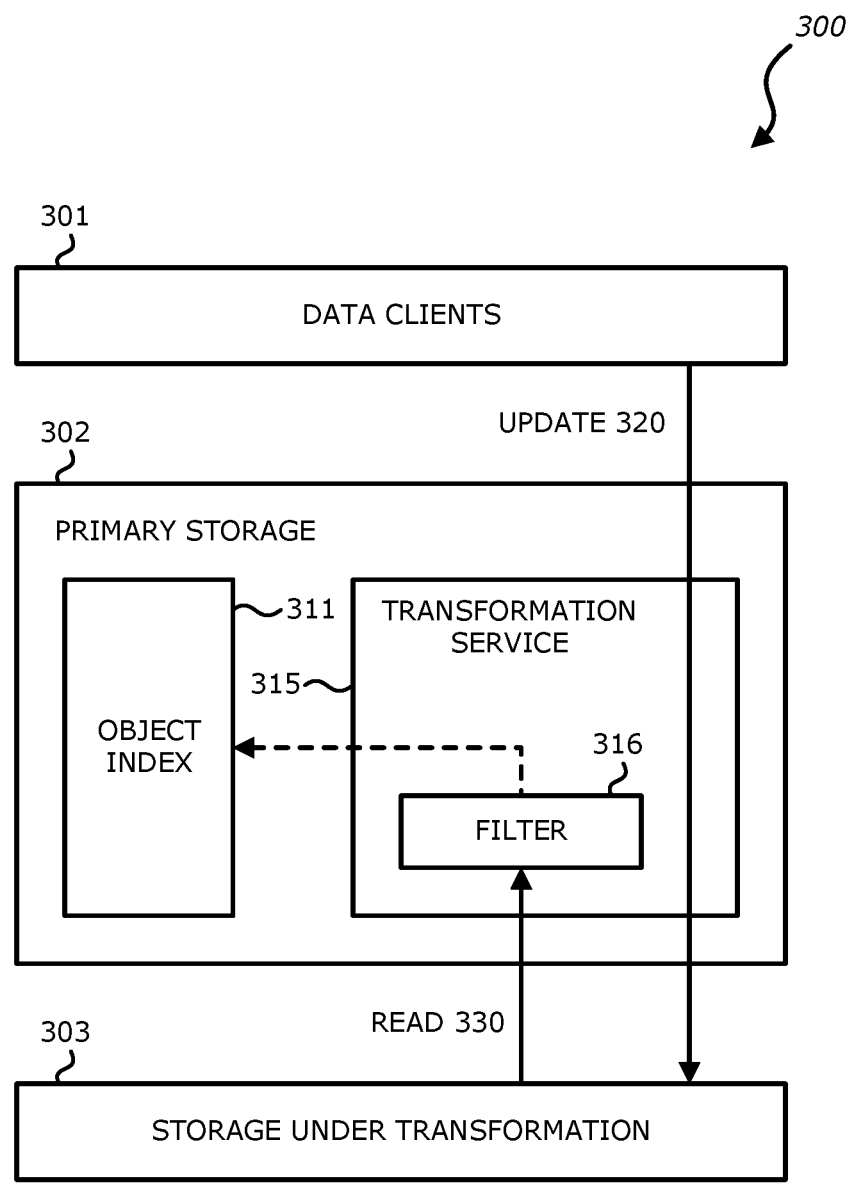
FIG. 3B is a block diagram for explaining an example execution of a selective storage transformation with co-existence of storages according to an embodiment herein.

FIG. 3B is a block diagram for explaining an example execution of the selective storage transformation 300 with co-existence of storages according to an embodiment herein. In FIG. 3B, during the execution of a transformation, the primary storage 302 assures co-existence of two storages. The primary storage 302 may assure co-existence of two storages by, for example, redirecting requests from data clients 301, which the primary storage 302 cannot handle, to the storage under transformation 303. When performing selective transformation, the transformation service 315 pays close attention to object updates. This is because an object being updated may change its transformation status. If an object before an update is not eligible for transformation and after the update it becomes eligible for transformation, then not handling the update request by the transformation service 315 may lead to a data unavailability event. As shown in FIG. 3B, the transformation service 315 redirects an update request 320 for a non-transformed object to the storage under transformation 303. Subsequently, the transformation service 315 reads the necessary metadata of the object transformed and applies the filter 316 to it. If the object passes the filter 316, the transformation service 315 adds the object to the object index 311 of the primary storage 302.

Figure 3C:
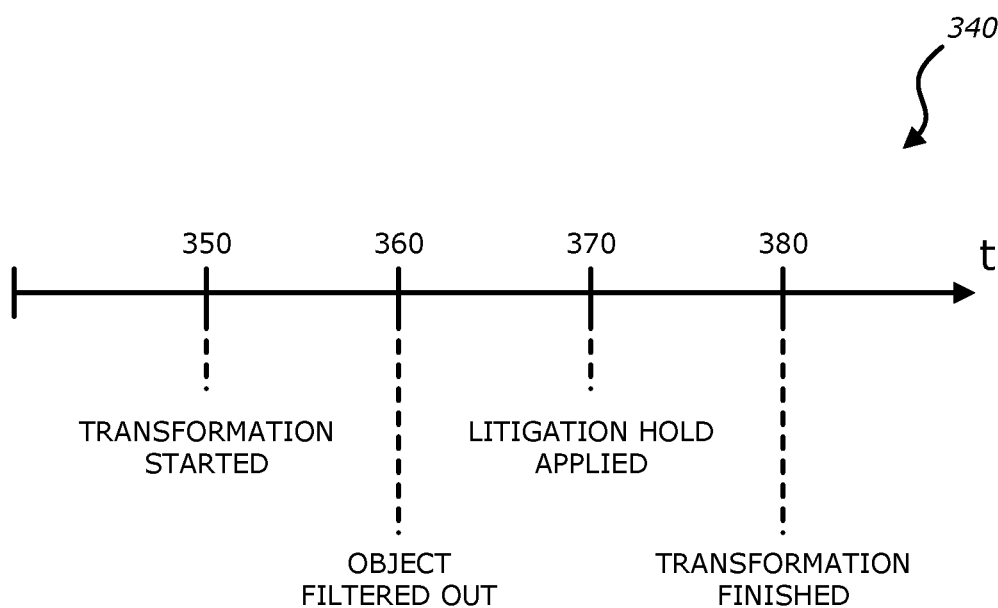
FIG. 3C is a timeline for explaining handling of an update request when performing a selective storage transformation according to an embodiment herein.

FIG. 3C is a timeline for explaining handling of an update request when performing a selective storage transformation according to an embodiment herein. The timeline 340 which illustrates a scenario when not handling an update request by the transformation service 315 may lead to a data unavailability event.

In one example, a user requests transformation only for objects which are under retention. In this example, the primary storage assures co-existence for the storages between the moments the transformation job starts 350 and finishes 380. At moment 360, the transformation service handles an object and makes a decision not to transform the object because the retention of the object has expired by that moment. After a while, but before the transformation job finishes 380, the application applies a litigation hold 370 to the object. This update makes the object under retention again. If the Transformation Service does not handle this update and does not make the primary storage aware of it, the object may become unavailable to the application after the transformation job finishes.

As described above, manual object list generation can be painful. It typically requires several iterations to complete transformation. When transformation is driven by professional services, this can mean additional cost for the company. The embodiments as illustrated, for example, in FIGS. 3A-3C, may avoid manual object list generation for selective storage transformation. Therefore, implementation of the embodiments described herein may help to reduce cost associated with alternation of storage generations.

Note that some or all of the components as shown and described above (e.g., primary storage clients 101 and 301, primary storage 102 and 302, and storages under transformation 103 and 303 of FIGS. 1 and 3A-B) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
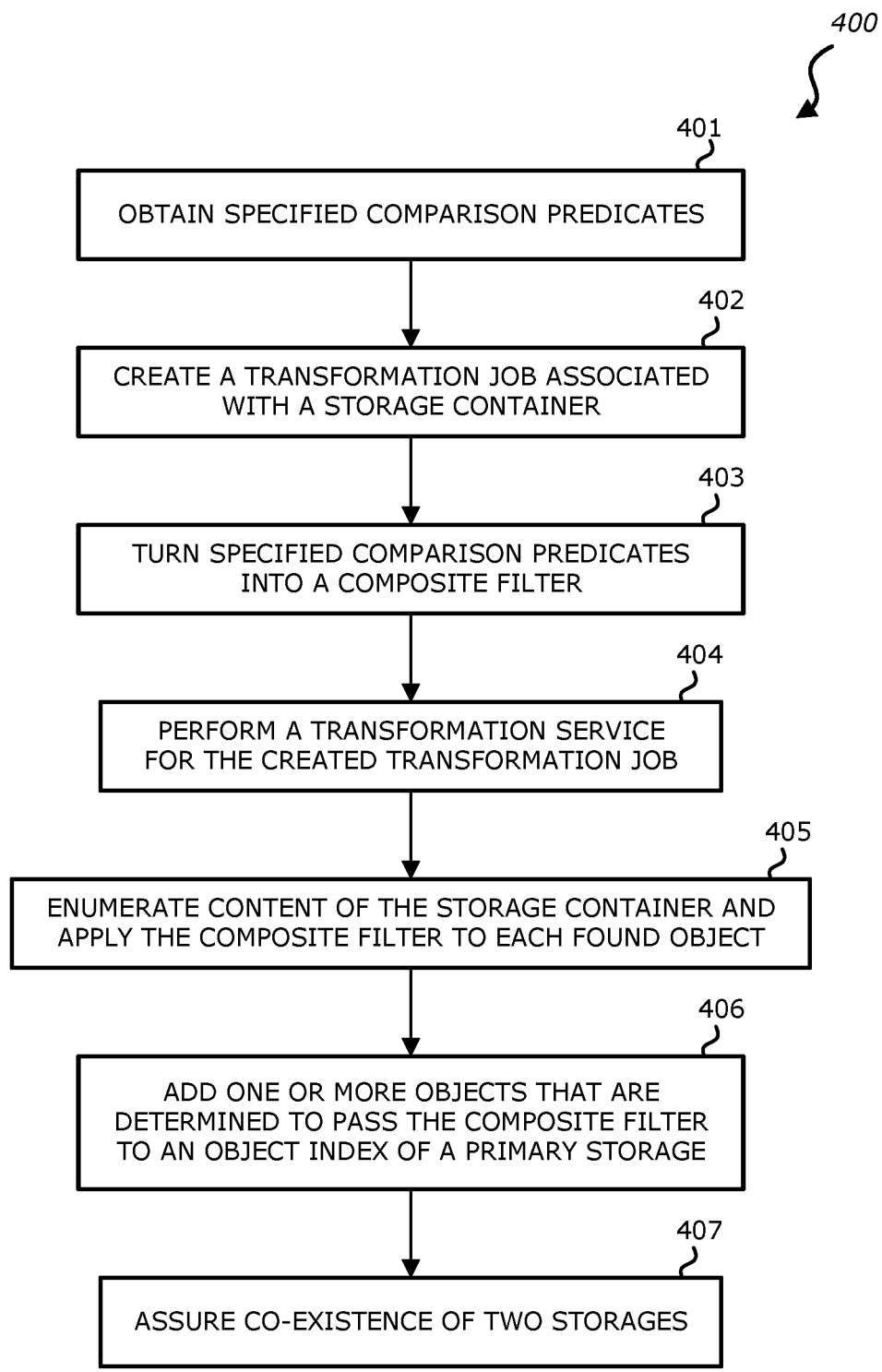
FIG. 4 is a flow diagram for explaining an example method for performing selective storage transformation according to an embodiment herein.

FIG. 4 illustrates a flow diagram for explaining an example process for storage transformation according to an embodiment herein. In this regard, the following embodiments may be described as a process 400, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 400 may be performed by processing logic that includes hardware (e.g. circuitry, dedicated logic, etc.), software (e.g., embodied on a non-transitory computer readable medium), or a combination thereof.

Referring to FIG. 4, at block 401, specified comparison predicates to restrict a set of objects in a storage container (e.g., storage 303) to transform are obtained. In this regard, a user can specify the comparison predicates to restrict the set of data objects to transform.

At block 402, a transformation job (e.g., transformation job 300 of FIGS. 3A and 3B) associated with the storage container (e.g., storage 303) is created. At block 403, specified comparison predicates (e.g., specified by a user) are turned into a composite filter (e.g., filter 316).

At block 404, a transformation service (e.g., transformation service 315) is performed for the created transformation job. At block 405, content of the storage container is enumerated and the composite filter is applied to each found object. At block 406, one or more objects that are determined to pass the composite filter are added to an object index (e.g., object index 311) of a primary storage (e.g., primary storage 302).

At block 407, the primary storage 302 assures co-existence of two storages. The assuring co-existence can be performed, for example, by redirecting a request from a data client (e.g., data clients 301), which the primary storage cannot handle, to the storage container under transformation.

In one example, the redirected request is an update request (e.g., update 320) for a non-transformed object. In this example, metadata of the non-transformed object is read (e.g., 330) and the composite filter is applied to the object. Also, in this example, the object is added to the object index of the primary storage if the object passes the composite filter.

In another example, in a case where an object is determined to not pass the composite filter because the specified comparison predicate for the object has expired after the transformation job has started and before the transformation job has finished, and the comparison predicate for the object is subsequently reinstated, the transformation service adds the object to the object index of the primary storage.

Figure 5:
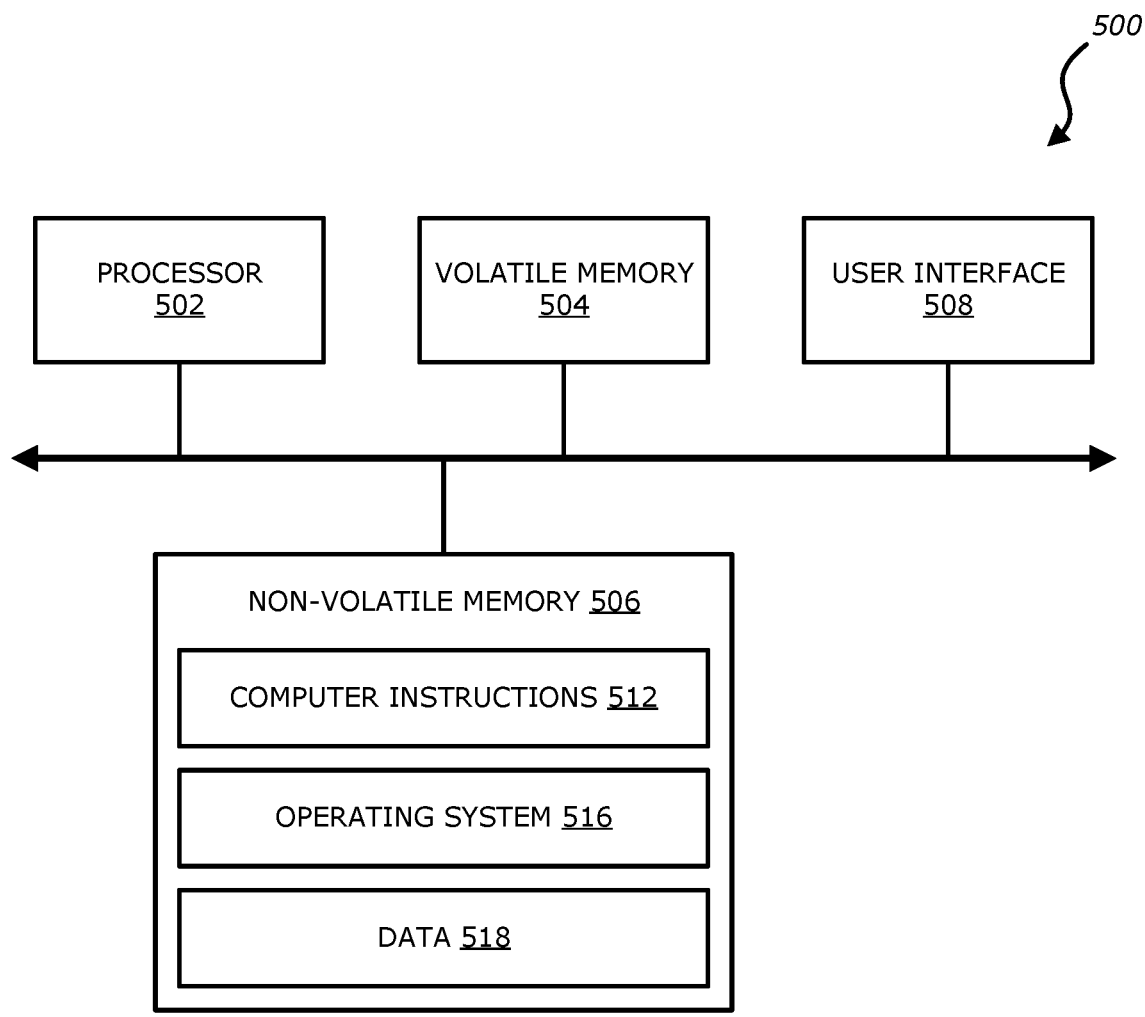
FIG. 5 is a block diagram for explaining an example data processing system on which any portion of the process of FIG. 4 may be implemented according to an embodiment herein.

FIG. 5 illustrates a block diagram of an example of a data processing system which may be used with one embodiment herein. For example, system 520 may represent any of data processing systems described above performing any of the processes or methods described above. System 520 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 520 is intended to show a high level view of many components of the computer system. However, it is to be understood that additional components may be present in certain implementations and furthermore, different arrangement of the components shown may occur in other implementations. System 520 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 520 includes a processor 502, a volatile memory 504, a non-volatile memory 506 (e.g., hard disk) and a user interface (UI) 508 (e.g., a graphical user interface, a mouse, a touch pad, a touch sensitive screen, a display, a pointer device such as a stylus, a keyboard, and so forth). The non-volatile memory 506 stores computer instructions 512, an operating system 516 and data 518. In one example, the computer instructions 512 are executed by the processor 502 out of volatile memory 504 to perform all or part of the processes described herein (e.g., process 400). In addition, executable code and/or data of a variety of operating systems, device drivers, firmware (e.g., input output basic system or BIOS), and/or applications can be loaded in the memory and executed by processor 502.

In one embodiment, system 520 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 520.

To provide for persistent storage of information such as data, applications, one or more operating systems and so forth, a mass storage (not shown) may also couple to processor 502. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 502, e.g., via a serial peripheral interface (SPI). This flash device may provide for non-volatile storage of system software, including a basic input/output software (BIOS) as well as other firmware of the system.

Processor 502 may represent a single processor or multiple processors with a single processor core or multiple processor cores included therein. Processor 502 may represent one or more general-purpose processors such as a microprocessor, a central processing unit (CPU), or the like. More particularly, processor 502 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 502 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 502, which may be a low power multi-core processor socket such as an ultra-low voltage processor, may act as a main processing unit and central hub for communication with the various components of the system. Such processor can be implemented as a system on chip (SoC).

According to one example embodiment, primary storage 302 is stored in non-volatile memory 506 and is executed by the processor 502 to cause system 520 to function in accordance with the techniques discussed herein.

FIG. 5 is merely one example of a particular implementation and is merely intended to illustrate the types of components that may be present in the system 520. Note that while system 520 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 400) are not limited to use with the hardware and software of FIG. 5; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

The processes described herein are not limited to the specific examples described. For example, process 400 is not limited to the specific processing order of FIG. 4. Rather, any of the processing blocks of FIG. 4 may be re-ordered, combined or removed, performed in parallel or in serial, as necessary, to achieve the results set forth above.

The processing blocks (for example, in the process 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 400 can be implemented in any combination hardware devices and software components.

Embodiments of the present invention are not described with reference to any particular programming language. It will be appreciated that a variety of programming languages may be used to implement the teachings of embodiments of the invention as described herein.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A method comprising:
   obtaining specified comparison predicates to restrict a set of objects in a storage container to transform;
   creating a transformation job associated with the storage container, the transformation job creation including turning the specified comparison predicates into a composite filter;
   performing a transformation service for the created transformation job, the transformation service performance including enumerating content of the storage container and applying the composite filter to each found object; and
   adding one or more objects that are determined to pass the composite filter to an object index of a primary storage, wherein during performance of the transformation service, the primary storage assures co-existence of the primary storage and the storage container to transform.

2. The method of claim 1 wherein assuring co-existence of the primary storage and the storage container to transform comprises redirecting a request from a data client, which the primary storage cannot handle, to the storage container under transformation.

3. The method of claim 2 wherein the redirected request is an update request for a non-transformed object, and the method further comprises:
   reading metadata of the non-transformed object and applying the composite filter to the object; and
   adding the object to the object index of the primary storage if the object passes the composite filter.

4. The method of claim 1 wherein in a case where an object is determined to not pass the composite filter because the specified comparison predicate for the object has expired after the transformation job has started and before the transformation job has finished, and the comparison predicate for the object is subsequently reinstated, the transformation service adds the object to the object index of the primary storage.

5. A data processing system comprising:
   electronic hardware circuitry constructed to:
   obtain specified comparison predicates to restrict a set of objects in a storage container to transform;
   create a transformation job associated with the storage container, the transformation job creation including turning the specified comparison predicates into a composite filter;
   perform a transformation service for the created transformation job, the transformation service performance including enumerating content of the storage container and applying the composite filter to each found object; and
   add one or more objects that are determined to pass the composite filter to an object index of a primary storage, wherein during performance of the transformation service, the primary storage assures co-existence of the primary storage and the storage container to transform.

6. The data processing system of claim 5 wherein assuring co-existence of the primary storage and the storage container to transform comprises redirecting a request from a data client, which the primary storage cannot handle, to the storage container under transformation.

7. The data processing system of claim 6 wherein the redirected request is an update request for a non-transformed object, and the electronic hardware circuitry is further constructed to:
   read metadata of the non-transformed object and apply the composite filter to the object; and
   add the object to the object index of the primary storage if the object passes the composite filter.

8. The data processing system of claim 5 wherein in a case where an object is determined to not pass the composite filter because the specified comparison predicate for the object has expired after the transformation job has started and before the transformation job has finished, and the comparison predicate for the object is subsequently reinstated, the transformation service adds the object to the object index of the primary storage.

9. A non-transitory computer-readable storage medium storing computer-executable instructions, the instructions causing a machine to execute a process comprising:
   obtaining specified comparison predicates to restrict a set of objects in a storage container to transform;
   creating a transformation job associated with the storage container, the transformation job creation including turning the specified comparison predicates into a composite filter;
   performing a transformation service for the created transformation job, the transformation service performance including enumerating content of the storage container and applying the composite filter to each found object; and
   adding one or more objects that are determined to pass the composite filter to an object index of a primary storage, wherein during performance of the transformation service, the primary storage assures co-existence of the primary storage and the storage container to transform.

10. The non-transitory computer-readable storage medium of claim 9 wherein assuring co-existence of the primary storage and the storage container to transform comprises redirecting a request from a data client, which the primary storage cannot handle, to the storage container under transformation.

11. The non-transitory computer-readable storage medium of claim 10 wherein the redirected request is an update request for a non-transformed object, and the electronic hardware circuitry is further constructed to:
   read metadata of the non-transformed object and apply the composite filter to the object; and
   add the object to the object index of the primary storage if the object passes the composite filter.

12. The non-transitory computer-readable storage medium of claim 9 wherein in a case where an object is determined to not pass the composite filter because the specified comparison predicate for the object has expired after the transformation job has started and before the transformation job has finished, and the comparison predicate for the object is subsequently reinstated, the transformation service adds the object to the object index of the primary storage.

* * * * *